(12) United States Patent
Dake et al.

(10) Patent No.: US 8,683,033 B2
(45) Date of Patent: Mar. 25, 2014

(54) APPARATUS, SYSTEM, AND METHOD FOR SERVER FAILOVER TO STANDBY SERVER DURING BROADCAST STORM OR DENIAL-OF-SERVICE ATTACK

(75) Inventors: Gregory W. Dake, Durham, NC (US); Jeffery M. Franke, Apex, NC (US); Phuong T. Nguyen, Cary, NC (US); Michael H. Nolterieke, Raleigh, NC (US); Torez Smith, Austin, TX (US); John K. Whetzel, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 1511 days.

(21) Appl. No.: 11/856,711

(22) Filed: Sep. 17, 2007

(65) Prior Publication Data

US 2009/0077413 A1 Mar. 19, 2009

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 5,828,569 A | * | 10/1998 | Fisher | 700/82 |
| 6,148,410 A | * | 11/2000 | Baskey et al. | 714/4.11 |
| 6,195,680 B1 | * | 2/2001 | Goldszmidt et al. | 709/203 |
| 6,804,627 B1 | * | 10/2004 | Marokhovsky et al. | 702/182 |
| 7,512,980 B2 | * | 3/2009 | Copeland et al. | 726/23 |
| 7,523,286 B2 | * | 4/2009 | Ramany et al. | 711/170 |
| 7,590,727 B1 | * | 9/2009 | Barnes | 709/224 |
| 8,176,526 B1 | * | 5/2012 | Yang et al. | 726/1 |
| 2002/0073338 A1 | | 6/2002 | Burrows et al. | 713/201 |
| 2002/0188711 A1 | * | 12/2002 | Meyer et al. | 709/223 |
| 2003/0144894 A1 | | 7/2003 | Robertson et al. | 705/8 |
| 2003/0163569 A1 | * | 8/2003 | Panasyuk et al. | 709/227 |

(Continued)

OTHER PUBLICATIONS

Chinchani. "Handling Failures and DOS Attacks Using Network Device Groups". University at Buffalo, SUNY. 2003. pp. 1-16.*

(Continued)

*Primary Examiner* — John Macilwinen
(74) *Attorney, Agent, or Firm* — Kunzler Law Group

(57) ABSTRACT

An apparatus, system, and method are disclosed to failover to a standby server when a primary server is under broadcast storm or denial-of-service ("DoS") attack. A primary attack sensing module is included to monitor a rate of incoming data from a computer network to a primary server and to determine if the rate of incoming data is above a primary data rate threshold. A standby contact module is included to request a standby data rate status from a standby server in response to the primary attack module determining that the rate of incoming data to the primary server is above the primary data rate threshold. The standby server is connected to the primary server over a private network. The standby data rate status includes a determination by the standby server of whether a rate of data received by the standby server is above a standby data rate threshold. A standby receiver module is included to receive a standby data rate status from the standby server over the private network. A switchover module is included to deactivate the primary server and to send a command to activate the standby server as a primary server in response to the received standby data rate status indicating that the rate of data received by the standby server has not exceeded the standby data rate threshold.

22 Claims, 6 Drawing Sheets

(56) References Cited

U.S. PATENT DOCUMENTS

| | | | |
|---|---|---|---|
| 2003/0172145 A1 | 9/2003 | Nguyen | 709/223 |
| 2004/0202330 A1 | 10/2004 | Harvey et al. | 308/277 |
| 2005/0005012 A1* | 1/2005 | Odhner et al. | 709/226 |
| 2005/0050139 A1* | 3/2005 | Creamer et al. | 709/200 |
| 2005/0198523 A1 | 9/2005 | Shanbhag et al. | 713/200 |
| 2005/0257213 A1 | 11/2005 | Chu et al. | 717/170 |
| 2006/0064426 A1* | 3/2006 | Barsness et al. | 707/100 |
| 2006/0184349 A1 | 8/2006 | Goud et al. | 703/24 |
| 2006/0206602 A1 | 9/2006 | Hunter et al. | 709/223 |
| 2009/0024868 A1* | 1/2009 | Joshi et al. | 714/4 |

OTHER PUBLICATIONS

IBM, "Method for AMM Detecting and Surviving a Network Broadcast Storm", Mar. 29, 2007.

* cited by examiner

APPARATUS, SYSTEM, AND METHOD FOR SERVER FAILOVER TO STANDBY SERVER DURING BROADCAST STORM OR DENIAL-OF-SERVICE ATTACK

BACKGROUND OF THE INVENTION

1. Field of the Invention

This invention relates to server protection and more particularly relates to maintaining communication with a server, such as an advanced management module ("AMM"), or standby server (standby AMM) during a broadcast storm or denial-of-service ("DoS") attack.

2. Description of the Related Art

While publicly accessible, open networks such as the Internet provide increased flexibility and accessibility, open networks also expose the networks to cyber attacks such as web vandalism, propaganda, unwanted email, gathering of private data, denial-of-service ("DoS") attacks, equipment disruption, and even attacks on critical infrastructure. Mass marketers, pranksters, counterculturalists, activists, terrorists, and even hostile governments engage in such activities for various reasons to disrupt the flow of communication, intentionally or as a byproduct of their activities.

Denial-of-service attacks are typically an intentional form of a cyber attack intended to prevent access to a computer system, server, or other computer resource by flooding the system or server with unwanted data at a high rate. Systems and servers under a DoS attack, because of the sheer volume of incoming data, typically cannot cope with the increased network traffic without either slowing responses to data requests to a near stop or stopping service of data requests all together.

Cyber attacks directed at a specific Internet Protocol ("IP") address or may disrupt a device by flooding the network from which the device communicates with unwanted data through a broadcast. The latter stages of this second type of attack are sometimes called a broadcast storm and the accumulation of broadcast and multicast traffic on a computer network is sometimes called broadcast radiation. The first type of cyber attack on a particular IP address is herein referred to as a DoS attack and flooding of a computer network with broadcast or multicast traffic is herein referred to as a broadcast storm.

Prior art methods of dealing with a DoS attack or broadcast storm typically rely on shutting down a server or device under attack. This method has several drawbacks. First, when a server or device is shut down, reboot may be lengthy and may delay server access until long after an attack is over. In another scenario, upon reboot the server or device might find that it is still under attack. A primary server with a standby server available may find itself under DoS attack or broadcast storm and may switch to the standby server only to find that the standby server is also under attack.

SUMMARY OF THE INVENTION

From the foregoing discussion, it should be apparent that a need exists for an apparatus, system, and method for a primary server to check the status of a standby server to determine if the standby server is under attack before making the standby server a primary server. In addition, the primary server may resume operation and/or resume operation as a primary server when the primary server is no longer under DoS attack or broadcast storm. Beneficially, such an apparatus, system, and method would quickly allow a standby server not under DoS attack or broadcast storm to assume the duties of the primary server.

The present invention has been developed in response to the present state of the art, and in particular, in response to the problems and needs in the art that have not yet been fully solved by currently available methods to handle a DoS attack or broadcast storm. Accordingly, the present invention has been developed to provide an apparatus, system, and method to failover to a standby server when a primary server is under broadcast storm or DoS attack that overcome many or all of the above-discussed shortcomings in the art.

The apparatus to failover to a standby server when a primary server is under broadcast storm or DoS attack is provided with a plurality of modules configured to functionally execute the necessary steps of determining if a primary server is under DoS attack or broadcast storm, determine if the standby server is under DoS attack or broadcast storm if the primary is under attack, and to switchover the standby to primary if the standby server is not under DoS attack or broadcast storm. These modules in the described embodiments include a primary attack sensing module that monitors a rate of incoming data from a computer network to a primary server and determines if the rate of incoming data is above a primary data rate threshold.

The apparatus includes a standby contact module that requests a standby data rate status from a standby server in response to the primary attack module determining that the rate of incoming data to the primary server is above the primary data rate threshold. The standby server is connected to the primary server over a private network. The standby data rate status includes a determination by the standby server of whether a rate of data received by the standby server is above a standby data rate threshold. The standby server is configured to become a primary server.

The apparatus includes a standby receiver module that receives a standby data rate status from the standby server over the private network. The apparatus includes a switchover module that deactivates the primary server and sends a command to activate the standby server in response to the received standby data rate status indicating that the rate of data received by the standby server has not exceeded the standby data rate threshold.

The apparatus, in one embodiment, includes a stop processing module that stops processing data received over the computer network in response to the primary attack module determining that the rate of incoming data from the computer network is above the primary data rate threshold. In another embodiment, the apparatus includes a resume module that directs the primary server to resume processing data in response to the primary attack sensing module determining that the rate of incoming data to the primary server has dropped below the primary data rate threshold for a predetermined amount of time. In another embodiment, the apparatus includes a switchback module that activates the primary server as primary and deactivates the standby server in response to the primary attack sensing module determining that the rate of incoming data to the primary server has dropped below the primary data rate threshold and prior to the resume module directing the primary server to resume processing data.

In one embodiment, the primary server and the standby server are management servers that manage a group of servers where each of the group of servers is connected to a computer network and services one or more clients. In another embodiment, the primary and standby servers are in communication with common data storage. The common data storage, for example, may include one or more of a storage area network ("SAN") with data storage devices, a redundant array of inexpensive/independent disks ("RAID"), a tape storage device, an optical drive, a backup storage system, and a hard drive.

In one embodiment, the primary attack sensing module samples the rate of incoming data over a period of time and determines if the rate of incoming data is above the primary data rate threshold for each sample. In another embodiment, sampling the rate of incoming data over a period of time includes sampling the rate of incoming data at least three times prior to the standby contact module requesting a standby data rate status where each sampling is separated by a predetermined time delay. In another embodiment, the standby server determines whether the rate of data received by the standby server is above a standby data rate threshold in the same manner as the primary attack sensing module determines if a rate of data received by the primary server is above the primary data rate threshold.

Another apparatus is provided to failover to a standby server when a primary server is under broadcast storm or DoS attack and is provided with a plurality of modules configured to functionally execute the necessary steps of receiving a standby data rate status request, responding to the request, and switching over the standby server as requested to primary if the standby request is not under DoS attack or broadcast storm. These modules in the described embodiments include a standby attack sensing module that monitors a rate of incoming data from a computer network to a standby server and determines if the rate of incoming data is above a standby data rate threshold.

The apparatus includes a standby rate request module that receives a standby data rate status request from a primary server over a private network. The primary server requests the standby data rate status in response to determining that a rate of data received by the primary server is above a primary data rate threshold. The apparatus includes a standby rate sending module that sends a standby data rate status to the primary server over the private network in response to the standby rate request module receiving the standby data rate status request. The standby data rate status includes an indication of whether the rate of incoming data to the standby server is above the standby data rate threshold.

The apparatus includes a switchover receiver module configured to receive a switchover command and activates the standby server as a primary server in response to receiving the switchover command. The primary server sends the switchover command in response to receiving the standby data rate status and to the standby data rate status indicating that the rate of incoming data to the standby server is below the standby data rate threshold.

In one embodiment, the apparatus includes a standby return module that receives a return command and returns the standby server to standby. The return command includes an instruction to return the standby server to standby and is sent in response to the primary server determining that the rate of incoming data to the primary server is below the primary data rate threshold for a predetermined period of time. In another embodiment, the standby server stops processing data received from the computer network in response to the standby attack sensing module determining that the rate of incoming data from the computer network to the standby server is above the standby data rate threshold.

A system of the present invention is also presented to failover to a standby server when a primary server is under broadcast storm or DoS attack. The system may be embodied by a computer network, a primary server in communication with the computer network and configured to receive data over the computer network and to process the data, a standby server in communication with the computer network and configured to receive data over a computer network and to process the data when acting as a primary server, and a private network facilitating private communication between the primary server and the standby server.

In particular, the system, in one embodiment, includes a primary attack sensing module that monitors a rate of incoming data from the computer network and generates an alert in response to determining that the rate of incoming data is above a primary data rate threshold. The system includes a standby contact module that requests a standby data rate status from the standby server in response to the primary attack module determining that the rate of incoming data to the primary server is above the primary data rate threshold. The standby data rate status includes a determination by the standby server of whether a rate of data received by the standby server is above a standby data rate threshold.

The system includes a standby receiver module that receives a standby data rate status from the standby server over the private network. The system includes a switchover module that deactivates the primary server and activates the standby server as a primary server in response to the received standby data rate status indicating that the rate of data received by the standby server has not exceeded the standby data rate threshold.

In one embodiment, the standby server receives data over the computer network from which the primary server receives data. In another embodiment, the standby server receives data over a computer network different from the computer network that the primary server receives data. In another embodiment, the private network is a secure network inaccessible to unauthorized devices. The private network may be, for example, an Ethernet network or an RS-485 network. In another embodiment, the standby server includes hardware, code, and data necessary to enable the standby server to assume a role of primary server after receiving a switchover command.

A method of the present invention is also presented to failover to a standby server when a primary server is under broadcast storm or DoS attack. The method in the disclosed embodiments substantially includes the steps necessary to carry out the functions presented above with respect to the operation of the described apparatus and system. In one embodiment, the method includes monitoring a rate of incoming data from a computer network to a primary server and determining if the rate of incoming data is above a primary data rate threshold. The method includes requesting a standby data rate status from a standby server in response to determining that the rate of incoming data to the primary server is above the primary data rate threshold. The standby server is connected to the primary server over a private network. The standby data rate status includes a determination by the standby server of whether a rate of data received by the standby server is above a standby data rate threshold, the standby server configured to become a primary server.

The method includes receiving a standby data rate status from the standby server over the private network. The method includes deactivating the primary server and sending a command to activate the standby server as primary in response to the received standby data rate status indicating that the rate of data received by the standby server has not exceeded the standby data rate threshold.

The method also may include suspending processing of data in response to determining that the rate of incoming data to the primary server is above the primary data rate threshold. In a further embodiment, the method includes sending a command to the standby server to return to standby and to return the primary server to primary in response to the rate of incoming data to the primary server remaining below the primary data rate threshold for a predetermined period of time.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
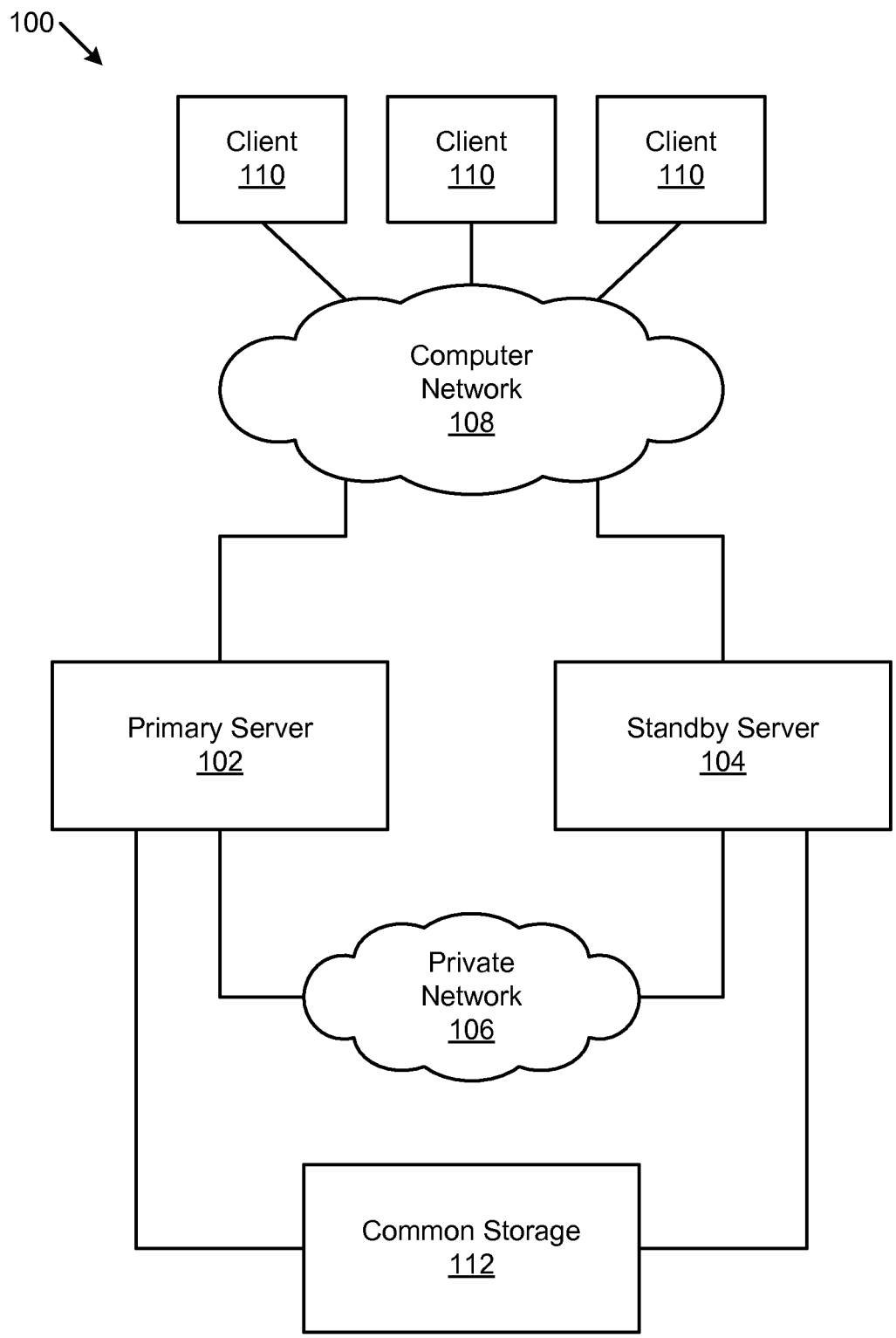
FIG. 1 is a schematic block diagram illustrating one embodiment of a system to failover to a standby server when a primary server is under broadcast storm or denial-of-service ("DoS") attack in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a schematic block diagram illustrating one embodiment of a system 100 to failover to a standby server when a primary server is under broadcast storm or denial-of-service ("DoS") attack in accordance with the present invention. The system 100 includes a primary server 102, a standby server 104, a private network 106, a computer network 108, clients 110, and a common storage 112, which are described below.

The system 100 includes a primary server 102 in communication with a standby server 104 over a private network 106 and connected to a computer network 108. The primary server 102 is typically in communication with one or more clients 110 over the computer network 108. The standby server 104 includes a capability to communicate with the clients 110 communicating with the primary server 102. In another embodiment, the standby server 104 communicates with clients 110 different than the clients 110 communicating with the primary server 102. The primary server 102 and standby server 104 communicate with clients 110 by sending and receiving data files, commands, data requests, etc.

The standby server 104 is typically a server that is capable of becoming a primary server in case of failure or disruption of the primary server 102. The standby server 104 is typically a hot standby that can take over primary server functions upon receiving a switchover command. The standby server 104 may include an operating system and configuration files that are the same or substantially similar to those on the primary server 102. In another embodiment, the standby server 104 may receive one or more configuration files, data files, mapping files, or the like prior to taking over functionality of the primary server 102, possibly as part of the switchover command.

The standby server 104, in one embodiment, is active and services clients 110, responds to data requests, etc. when not acting as a primary server. In another embodiment, the standby server 104 is inactive with respect to responding to data requests and clients 110 when not acting as a primary server. One of skill in the art will recognize other features and functions of a standby server 104 as well as other types of standby servers 104 configured to take over functions of a failed or disrupted primary server 102.

In a preferred embodiment, the primary server 102 and standby server 104 receive and send data by dividing the files, commands, and other data into data packets. In another embodiment, the primary and standby servers 102, 104 receive and send data in a form other than data packets. A data packet is a formatted block of data sent over a computer network. Other computer networks may not send data packets, such as point-to-point telecommunication links, and may instead transmit a series of bytes, characters, or bits. Most modern networks transmit data packets because the network can transmit longer messages efficiently and reliably. Typically a data packet includes a header, data, and a trailer. The header typically includes formatting information, addressing information, error correction information, and the like. The data section may include data divided into 8-bit bytes or other similar units of data. The trailer section may include a checksum for error correction. The primary and standby servers 102, 104 monitor a rate of incoming data, whether in the form of data packets or not.

The primary server 102 and standby server 104 monitor the rate incoming data to determine if the primary server 102 or standby server 104 is under DoS attack or broadcast storm. Monitoring an incoming data rate to detect a DoS attack or broadcast storm is described in detail in relation to FIGS. 2 and 3 below.

The system 100 includes a private network 106 that connects the primary server 102 and the standby server 104. The private network 106 is a connection that allows computers, such as the primary and standby servers 102, 104 to communicate without any public connection accessible to non-authorized computers. The private network 106 may achieve privacy physically or by using other security techniques. For example, the private network 106 may connect only to authorized computers such as the primary and standby servers 102, 104.

The authorized computers typically include means to segregate communications over the private network 106 from other communications. For example, the authorized computers may each include a firewall or similar segregation means. The private network 106 may use dedicated cables, routers, switches, etc. to preserve privacy. The private network 106 is typically immune from DoS attack or broadcast storm. In one embodiment, the private network 106 is a dedicated Ethernet network. In another embodiment, the private network 106 is a dedicated RS-485 bus. Other networks that provide privacy may also be used as the private network 106.

The private network 106, in one embodiment, includes electronic means to ensure privacy. The electronic means may be in addition to physical means for ensuring privacy. The electronic means may include encryption, logon requirements, a password, etc. The electronic means to provide privacy, along with any physical means, allows the primary server 102 to communicate with the standby server 104 privately to enable communication when the primary server 102 and/or standby server 104 are under DoS attack or broadcast storm. One of skill in the art will recognize other private networks 106 and other ways to allow private communication between the primary and standby servers 102, 104 when one or both are under DoS attack or broadcast storm.

The system 100 includes a computer network 108 in communication with the primary server 102 and the standby server 104. In one embodiment, one computer network 108 allows communication with the primary server 102 and another computer network 108 allows communication with the standby server 104. In another embodiment, the primary and standby servers 102, 104 communicate over a common computer network 108 but are partially separated by connecting to different switches, routers, communication channels, or the like. Typically, the primary server 102 has a different Internet Protocol ("IP") address than the standby server 104.

In one embodiment, the system 100 is configured such that a DoS attack may be directed at the primary server 102 but not at the standby server 104 and simultaneously, or at a different time, both servers 102, 104 may be under the same broadcast attack. In another embodiment, the system 100 is configured with routers, switches, etc. such that the primary server 102 may be under a broadcast storm that does not affect the standby server 104. The computer network 108 may include the Internet, a wide area network ("WAN"), a local area network ("LAN"), a fiber channel network, a storage area network ("SAN"), a wireless network, other network, or a combination of networks. The computer network 108 comprises cables, switches, routers, etc. The computer network 108 typically allows the primary and standby servers 102, 104 to communicate with clients 110 and other computers and devices to service data requests, send and receive commands and data. One of skill in the art will recognize other computer network 108 configurations and types.

The primary server 102, in one embodiment, includes a connection to a common storage 112. The standby server 104, in one embodiment, also includes a connection to the common storage 112. The common storage 112 may be a hard drive, a tape drive, an optical drive, a redundant array of inexpensive/independent disks ("RAID"), or the like and may include one or more data storage devices. The common storage 112, in one embodiment is connected to the primary server 102 and/or the standby server 104 by way of a storage area network ("SAN"). In another embodiment, the primary server 102 and/or the standby server 104 includes a data storage device that is not accessible to another device, such as the standby server 104. In yet another embodiment, the primary server 102 includes a data storage device and is also connected to common storage 112.

In one embodiment, the primary server 102 and standby server 104 are management modules such as an Advanced Management Module ("AMM") in a BladeCenter® made by IBM of Armonk, N.Y. A management module, such as an AMM, typically manages several rack-mounted servers (not shown), such as a Blade Server. In the embodiment, the rack mounted servers connect to common storage 112 and the management modules 102, 104 communicate with the rack mounted servers to manage temperature, to monitor server health, to configure the servers, and the like. In another embodiment, the primary and standby servers 102, 104 can access common storage 112 accessible to rack-mounted servers.

The common storage 112, whether connected to the primary and standby servers 102, 104 or connected to rack mounted servers managed by the primary and standby servers 102, 104 typically is used to service client 110 data requests. One of skill in the art will recognize other configurations of common storage 112 accessible to primary and standby servers 102, 104 and/or to rack-mounted servers as well as other data storage devices that are part of or accessible to the primary and standby servers 102, 104.

Figure 2:
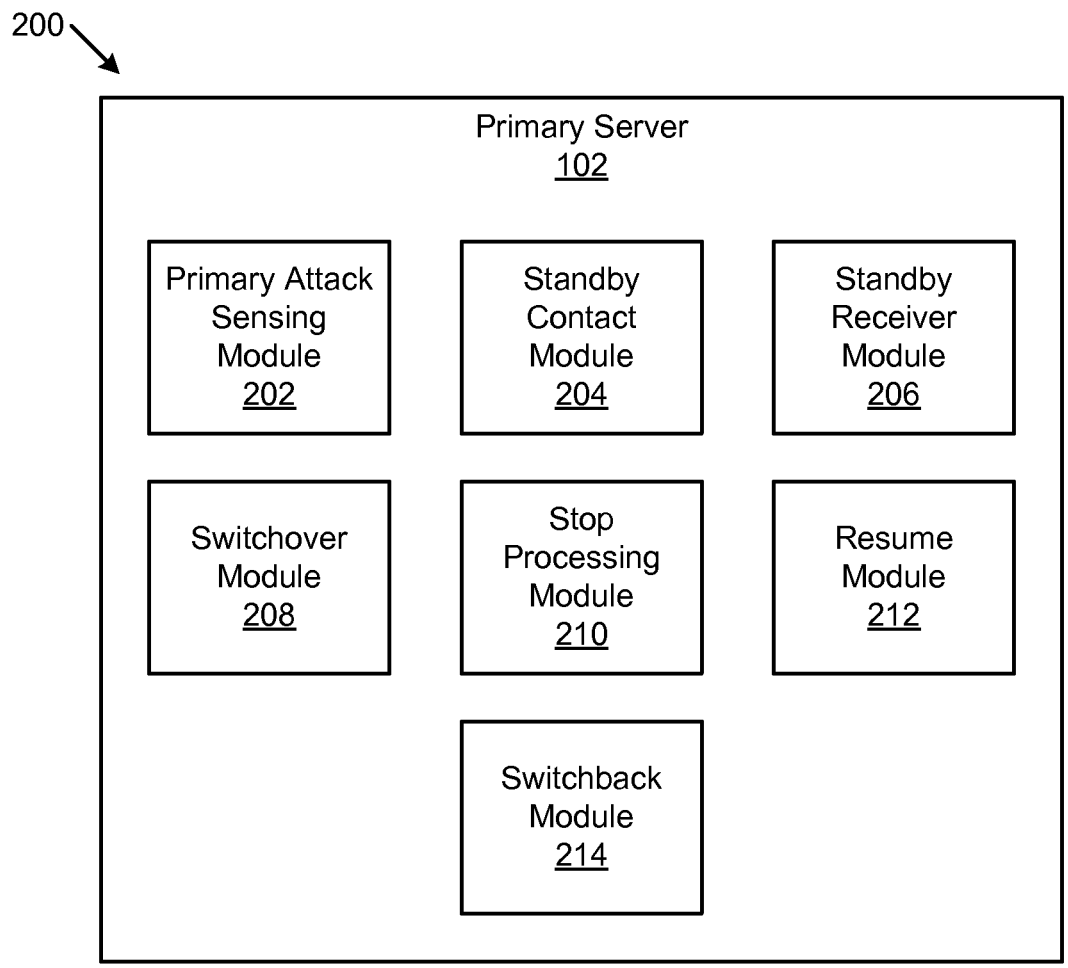
FIG. 2 is a schematic block diagram illustrating one embodiment of a primary server with an apparatus to failover to a standby server when a primary server is under broadcast storm or DoS attack in accordance with the present invention.

FIG. 2 is a schematic block diagram illustrating one embodiment of a primary server 102 with an apparatus 200 to failover to a standby server 104 when the primary server 102 is under broadcast storm or DoS attack in accordance with the present invention. The apparatus 200 includes, in one embodiment, a primary attack sensing module 202, a standby contact module 204, a standby receiver module 206, a switchover module 208, a stop processing module 210, a resume module 212, and a switchback module 214, which are described below. In one embodiment, the apparatus 200, with accompanying modules 202-214, is part of the primary server 102. In another embodiment, the apparatus 200 is not a part of the primary server 102, but communicates with the primary server 102. In yet another embodiment, a portion of the apparatus 200, such as some of the modules 202-214, is part of the primary server 102.

The apparatus 200 includes a primary attack sensing module 202 that monitors a rate of incoming data from the computer network 108 to the primary server 102 and determines if the rate of incoming data is above a primary data rate threshold. In a preferred embodiment, the primary attack sensing module 202 monitors a rate of incoming data packets from the computer network 108 to the primary server 102. In another embodiment, the primary attack sensing module 202 monitors a rate of bits, bytes, etc.

In one embodiment, the primary attack sensing module 202 uses other information to determine if a rate of incoming data exceeds the primary data rate threshold, such as time of day, type of data, source of data, etc. For example, the primary attack sensing module 202 may adjust the primary data rate threshold based on time of day. In another example, the primary attack sensing module 202 may deduct data received from a known client 110 or from a client 110 that is connected or otherwise legitimately transmitting data. One of skill in the art will recognize other ways that the primary attack sensing module 202 may determine if the incoming data rate exceeds a primary data rate threshold.

In one embodiment, the primary attack sensing module 202 monitors the rate of incoming data periodically. For example, the primary attack sensing module 202 may sample the rate of incoming data after a predetermined time period. In another embodiment, the primary attack sensing module 202 continuously samples the rate of incoming data. In this embodiment, the primary attack sensing module 202 may use a counter and start at a particular point in time to count data packets, bytes, bits, or another increment of data. At the end of a time period, the count and time period are used to calculate a data rate. At the end of the time period, a new sampling may begin. Where the primary attack sensing module 202 samples the rate of incoming data, a new sample may begin after a time delay.

In another embodiment, the primary attack sensing module 202 uses a moving window of time approach and counts incoming data packets, bits, bytes, etc. within the window time to determine a rate of incoming data. Typically the standby server 104 monitors the rate if incoming data to the standby server 104 using a method that is the same or similar to the method used by the primary attack sensing module 202 for the primary server 102. Preferably, the standby server 104 monitors a rate of incoming data to the standby server 104 simultaneously with the primary attack sensing module 202. In another embodiment, the standby server 104 monitors a rate of incoming data when requested. One of skill in the art will recognize other ways for the primary attack sensing module 202 and standby server 104 to monitor a rate of incoming data.

In a preferred embodiment, the primary server 102 remains operational after the primary attack sensing module 202 senses that the primary server 102 is under DoS attack or broadcast storm by determining that the incoming data rate from the computer network 108 is above a primary data rate threshold. Advantageously, by remaining operational instead of shutting down, the primary server 102 is able to resume duties of a primary server after the primary attack sensing module 202 determines that the DoS attack or broadcast storm is over. After the primary attack sensing module 202 determines that the primary data rate threshold has been exceeded, the stop processing module 210 stops processing incoming data from the computer network 108, but the operating system of the primary server 102 continues to execute.

To stop processing data, the stop processing module 210 may vary the primary server 102 offline, may disable a port connected to the computer network 108, or other similar action allowing the primary server 102 to operate after a DoS attack or broadcast storm is detected while preventing incoming data from the computer network 108 to disrupt the primary server 102. The primary server 102 may continue to communicate over the private network 106 to the standby server 104 or other computers connected to the private network 106. The primary server 102 may also execute commands from a keyboard, display information, and otherwise continue operation while offline. In another embodiment, the stop processing module 210 shuts down the primary server 102 after the primary attack sensing module 202 senses a DoS attack or broadcast storm.

The apparatus 200 includes a standby contact module 204 that requests a standby data rate status from a standby server 104 in response to the primary attack sensing module 202 determining that the rate of incoming data is above the primary data rate threshold. The standby server 104 is connected to the primary server 102 over the private network 106 and typically the standby contact module 204 makes the request for the standby data rate status over the private network 106.

The standby data rate status comprises a determination by the standby server 104 of whether a rate of data received by the standby server 104 is above a standby data rate threshold. In another embodiment, the standby server 104 includes more than one standby data rate threshold where a higher threshold may indicate a more severe condition. In another embodiment, the standby server 104 includes factors other than incoming data rate to determine a standby data rate status. Other information may also be included with a standby data rate status and requested by the standby contact module 204, such as standby server 104 status, health, temperature, etc. One of skill in the art will recognize other ways to request a standby data rate status and other pertinent standby server 104 status information.

The apparatus 200 includes a standby receiver module 206 that receives a standby data rate status from the standby server 104 over the private network 106. The standby receiver module 206 typically receives a standby data rate status in conjunction with a request for a standby data rate status sent by the standby contact module 204. The standby receiver module 206 may receive other status information from the standby server 104 in addition to the standby data rate status.

The apparatus 200 includes a switchover module 208 that deactivates the primary server 102 and sends a command to activate the standby server 104 in response to the received standby data rate status indicating that the rate of data received by the standby server 104 has not exceeded the standby data rate threshold. In one embodiment, the switchover module 208 deactivates the primary server 102 by varying the primary server 102 offline and sending a command to the standby server 104 to bring the standby server 104 online. The switchover module 208 may also cause the standby server 104 to assume functions and duties of the primary server 102. For example, if the primary server 102 was servicing a data request from a client 110 when the primary attack sensing module 202 detected a broadcast storm or DoS attack, the switchover module 208 may take action to cause the standby server 104 to service the data request from the client 110.

The apparatus 200 includes, in one embodiment, a resume module 212 that directs the primary server 102 to resume processing data in response to the primary attack sensing module 202 determining that the rate of incoming data to the primary server 102 has dropped below the primary data rate threshold. In one embodiment, the standby server 104 is under DoS attack or broadcast storm and has not been activated as a primary server by the switchover module 208. The resume module 212 then directs the primary server 102 to resume processing data after the primary attack sensing module 202 has determined a DoS attack or broadcast storm is over and the standby server 104 continues in a standby mode.

In another embodiment, the standby server 104 is unavailable or does not exist. In this case, the resume module 212 then directs the primary server 102 to resume processing data after the primary attack sensing module 202 has determined a DoS attack or broadcast storm is over without regard to any state of a standby server 104.

In one embodiment, the resume module 212 acts automatically. In another embodiment, the resume module 212 sends a notification that the primary server 102 is not under DoS attack or broadcast storm and then resumes processing data after receiving a command from a user, administrator, computer, etc. to resume processing.

In another embodiment, the apparatus 200 includes a switchback module 214 that activates the primary server 102 as primary and deactivates the standby server 104 in response to the primary attack sensing module 202 determining that the rate of incoming data to the primary server 102 has dropped below the primary data rate threshold and prior to the resume module 212 directing the primary server 102 to resume processing data. The switchback module 214 may act automatically or after receiving a command to switchback. In one embodiment, the switchback module 214 acts in conjunction with the resume module 212 to restore the primary server 102 to primary server duties and resume processing data and to switch the standby server 104 back to standby. One of skill in the art will recognize other ways that the resume module 212 and switchback module 214 can respond to various scenarios to switch the standby server 104 to standby, the primary server 102 to primary, and to resume data processing.

Figure 3:
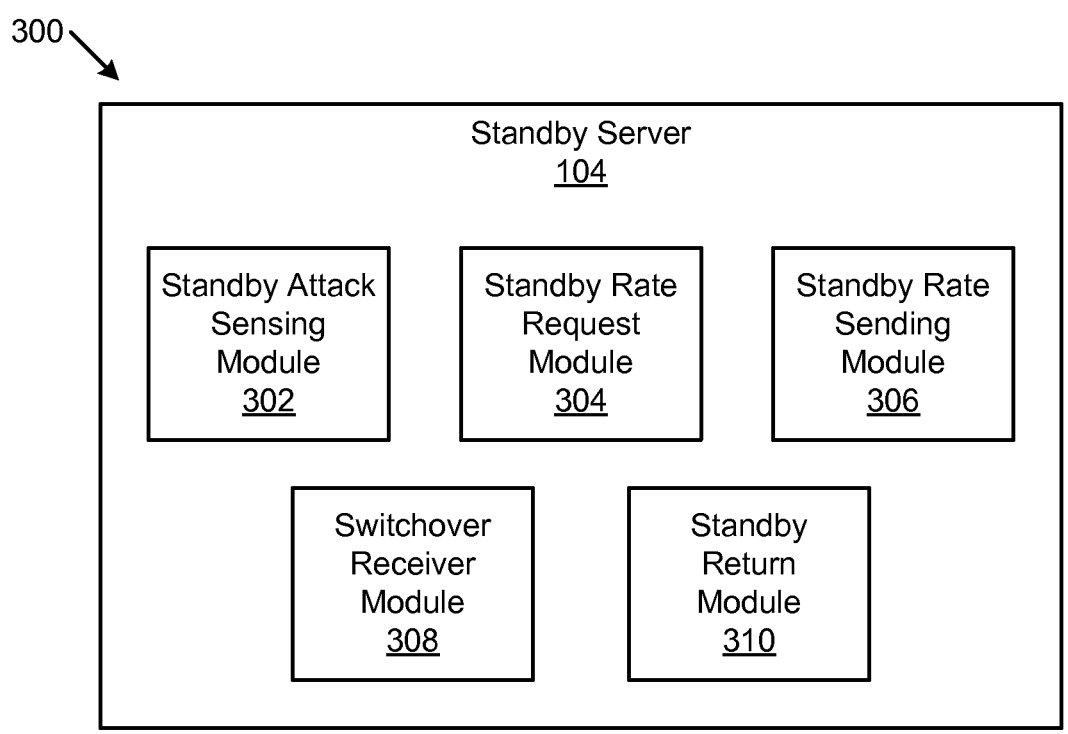
FIG. 3 is a schematic block diagram illustrating one embodiment of a standby server with an apparatus to failover to a standby server when a primary server is under broadcast storm or DoS attack in accordance with the present invention.

FIG. 3 is a schematic block diagram illustrating one embodiment of a standby server 104 with an apparatus 300 to failover to a standby server when a primary server 102 is under broadcast storm or DoS attack in accordance with the present invention. The apparatus 300 includes, in one embodiment, a standby attack sensing module 302, a standby rate request module 304, a standby rate sending module 306, a switchover receiver module 308, and a standby return module 310, which are described below.

The apparatus 300 includes a standby attack sensing module 302 that monitors a rate of incoming data from the computer network 108 to the standby server 104 and determines if the rate of incoming data is above a standby data rate threshold. In one embodiment, the standby attack sensing module 302 is substantially similar to the primary attack sensing module 202 except that it monitors incoming data for the standby server 104 instead of the primary server 102. The standby attack sensing module 302 may include sampling, time delays, etc. to determine if the standby server 104 is under a DoS attack or broadcast storm in the same way as the primary attack sensing module 202.

The standby attack sensing module 302 may monitor incoming data from the same computer network 108 from which the primary server 102 receives data or may monitor incoming data from another computer network 108. In a preferred embodiment, the standby attack sensing module 302 monitors incoming data while the primary attack sensing module 202 monitors incoming data. In another embodiment, the standby attack sensing module 302 monitors incoming data to service a standby data rate status request from the primary server 102.

The apparatus 300 includes a standby rate request module 304 that receives a standby data rate status request from the primary server 102 over the private network 106. The primary server 102 requests the standby data rate status in response to determining that a rate of data received by the primary server 102 is above the primary data rate threshold. The standby data rate request may include a request for other data from the standby server 104 such as status, health, configuration, temperature, etc. of the standby server 104.

The apparatus 300 includes a standby rate sending module 306 that sends a standby data rate status to the primary server 102 over the private network 106 in response to the standby rate request module 304 receiving the standby data rate status request. The standby data rate status includes an indication of whether the rate of incoming data to the standby server 104 is above the standby data rate threshold. The standby rate sending module 306 may also send status information, temperature, operation mode, etc. along with the standby data rate status.

The apparatus 300 includes a switchover receiver module 308 that receives a switchover command and activates the standby server 104 as a primary server 102 in response to receiving the switchover command. The primary server 102 sends the switchover command in response to receiving the standby data rate status and the standby data rate status indicating that the rate of incoming data to the standby server 104 is below the standby data rate threshold. The primary server 102 may send a switchover command for other reasons as well, such as a failure or disruption of the primary server 102. In one embodiment, the standby server 104 does not respond to a switchover command in cases such as standby server 104 failure, communication failure, etc. In another embodiment, the standby server 104 does not respond to the switchover command when the standby attack sensing module 302 determines that the standby server 104 is under DoS attack or broadcast storm after sending a standby data rate status to the contrary.

In one embodiment, the apparatus 300 includes a standby return module 310 that receives a return command to return the standby server 104 to standby. The standby return module 310 responds by returning the standby server 104 to standby. Typically, the return command is sent in response to the primary server 102 determining that the rate of incoming data to the primary server 102 is below the primary data rate threshold for a predetermined period of time. However, the primary server 102 may send a return command for other reasons, such as in response to the standby attack sensing module 302 determining that the standby server 104 is under DoS attack or broadcast storm, that the standby server 104 has failed, that the primary server 102 has been reconfigured, etc. One of skill in the art will recognize other reasons that the primary server 102 may send a return command.

In one embodiment, the apparatus 200 described in FIG. 2 and the apparatus 300 described in FIG. 3 are included in both the primary and standby servers 102, 104, have equal access to the servers 102, 104, etc. In this embodiment, the primary server 102 and standby server 104 can be switched so that the primary server 102 becomes a standby server and the standby server 104 becomes a primary server. The new primary and standby servers 102, 104 may act in this capacity until another switchover occurs either by command or as a result of a DoS attack or broadcast storm on the new primary server 102. One of skill in the art will recognize other ways to implement the functions of the apparatuses 200, 300 described in FIGS. 2 and 3 to maximize configuration flexibility.

Figure 4:
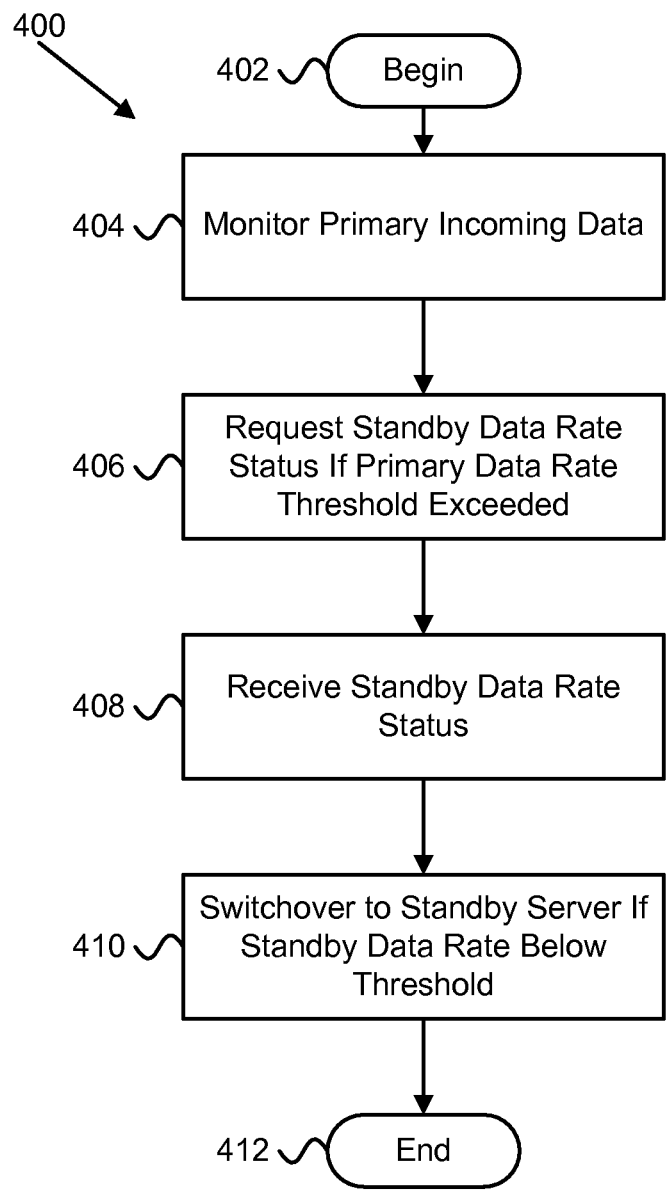
FIG. 4 is a schematic flow chart diagram illustrating one embodiment of a method to failover to a standby server when a primary server is under broadcast storm or DoS attack in accordance with the present invention.

FIG. 4 is a schematic flow chart diagram illustrating one embodiment of a method 400 to failover to a standby server 104 when a primary server 102 is under broadcast storm or DoS attack in accordance with the present invention. The method 400 begins 402 and the primary attack sensing module 202 monitors 404 incoming data from the computer network 108 to the primary server 102. The primary attack sensing module 202 determines if the primary server 102 is under a DoS attack or broadcast storm by monitoring a rate of incoming data to the primary server 102. In one embodiment, the primary attack sensing module 202 monitors 404 a rate of incoming data packets, but may also monitor 404 a rate of incoming bits, bytes, or any other convenient unit of data. The primary attack sensing module 202 determines if the rate of incoming data to the primary server 102 from the computer network 108 is above a primary data rate threshold.

If the primary attack sensing module 202 determines that the incoming data rate is above the primary data rate threshold, the standby contact module 204 requests 406 a standby data rate status from the standby server 104 over the private network 106. Typically the standby attack sensing module 302 is continually monitoring a rate of incoming data from the computer network 108 connected to the standby server 104 and determines if the rate of incoming data to the standby server 104 is above a standby data rate threshold. The standby server 104 sends a standby data rate status over the private network 106 that includes whether or not the rate of incoming data to the standby server 104 is above the standby data rate threshold. The standby receiver module 206 receives 408 the standby data rate status over the private network 106.

If the standby data rate status indicates that the rate of incoming data to the standby server 104 is below the standby data rate threshold, the switchover module 208 switches over 410 so the standby server 104 becomes a primary server and the method 400 ends 412. In one embodiment, the switchover module 208 deactivates 410 the primary server 102 as a primary and sends 410 a command to activate the standby server 104, typically over the private network 106. The switchover module 208 may also reroute incoming data from the primary server 102 to the standby server 104. One of skill in the art will recognize methods, commands, hardware, etc. to switchover 410 the primary server 102 to become inactive or a standby server and to activate the standby server 104 as a primary server.

Figure 5:
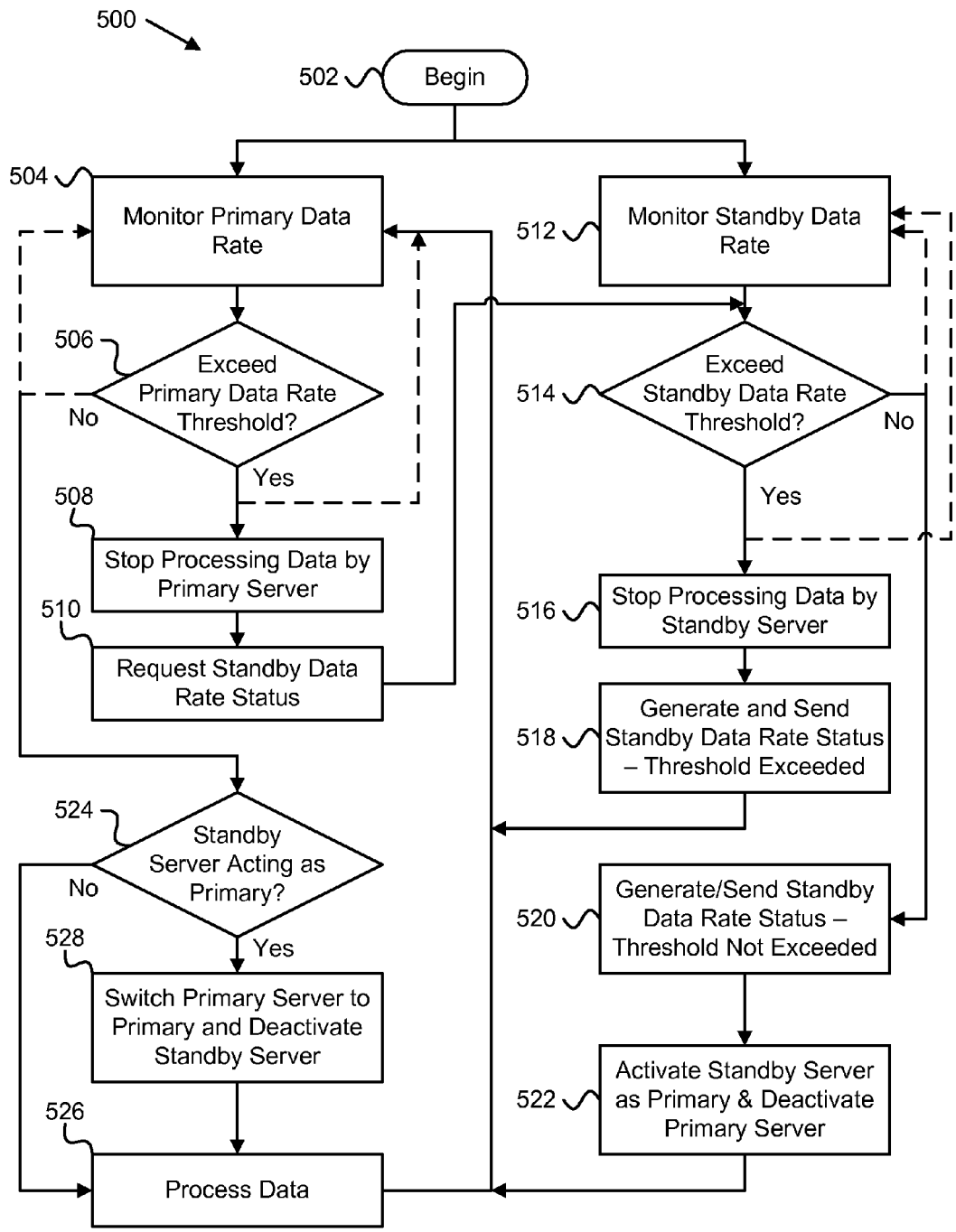
FIG. 5 is a schematic flow chart diagram illustrating another embodiment of a method to failover to a standby server when a primary server is under broadcast storm or DoS attack in accordance with the present invention.

FIG. 5 is a schematic flow chart diagram illustrating another embodiment of a method 500 to failover to a standby server 104 when a primary server 102 is under broadcast storm or DoS attack in accordance with the present invention. The method 500 begins 502 and the primary attack sensing module 202 monitors 504 a rate of incoming data to the primary server 102. The primary attack sensing module 202 also determines 506 if the rate of incoming data to the primary server 102 is above a primary data rate threshold. In this embodiment, the primary attack sensing module 202 continues to monitor 504 incoming data whether or not the rate of incoming data is above the primary data rate threshold (shown here as dashed lines).

If the primary attack sensing module 202 determines 506 that the rate of incoming data to the primary server 102 is above the primary data rate threshold, the stop processing module 210 stops 508 processing data and the standby contact module 204 requests 510 a standby data rate status over the private network 106. As the method 500 begins 502, the standby attack sensing module 302 monitors 512 a rate of incoming data to the standby server 104. The standby attack sensing module 302 determines 514 if the rate of incoming data to the standby server 104 is above the standby data rate threshold. In this embodiment, the standby attack sensing module 302 continues to monitor 512 incoming data to the standby server 104 to determine 512, 514 whether or not the rate of incoming data is above the standby data rate threshold (shown here as dashed lines).

If the standby attack sensing module 302 determines 514 that the rate of incoming data is above the standby data rate threshold, the standby server 104 stops 516 processing data received from the computer network 108 if any data is being processed. (In an embodiment where the standby server 104 is idle while in standby mode the standby server 104 may not be processing data from the computer network 108.) The standby rate sending module 306 generates 518 a standby data rate status that indicates that the rate of incoming data has exceeded or is above the standby data rate threshold and sends the standby data rate status over the private network 106. The standby server 104 is not switched to a primary server in this case because the standby attack sensing module 302 has determined 514 that the standby server 104 is under DoS attack or broadcast storm so the primary attack sensing module 202 continues to monitor 504 the rate of incoming data to the primary server 102.

If the standby attack sensing module 302 determines 514 that the rate of incoming data to the standby server 104 is below the standby data rate threshold, the standby rate sending module 306 generates 520 a standby data rate status that indicates that the rate of incoming data is below the standby data rate threshold and sends the standby data rate status over the private network 106. The switchover module 208 deactivates 522 the primary server 102 and activates 522 the standby server 104 as primary server. The standby server 104 then takes over the duties of the primary server 102 to receive and reply to data requests, commands, etc. received from the clients 110 over the computer network 108 connected to the standby server 104. The primary server 102 continues to monitor 504 incoming data.

If the primary attack sensing module 202 determines 506 that the rate of incoming data to the primary server 102 is not above or has dropped below the primary data rate threshold, the switchback module 214 determines 512 if the standby server 104 is acting as a primary server and/or if the primary server 102 is otherwise deactivated. If the switchback module 214 determines 512 that the standby server 104 is not acting as a primary server and the primary server 102 is active as a primary, the resume module 212 directs 526 the primary server 102 to resume processing incoming data from the computer network 108 and the primary attack sensing module 202 continues to monitor 502 the rate of incoming data to the primary server 102.

The switchback module 214 may determine 524 that the standby server 104 is not acting as a primary server when, for example, if a standby data rate status request has not been sent, if a standby data rate status indicates that the standby server 104 is also under DoS attack or broadcast storm, or if for some other reason the standby server 104 has not been switched to operate as a primary server. The primary server 102 may also be active if the primary attack sensing module 202 has determined that the primary server 102 is not under DoS attack or broadcast storm.

If the switchback module 214 determines 524 that the standby server 104 is not acting as a primary server, the switchback module 214 switches 528 the primary server 102 to act as the primary server and deactivates 528 the standby server 104 from primary server duties. The primary attack sensing module 202 then continues to monitor 504 incoming data to the primary server 102.

Figure 6:
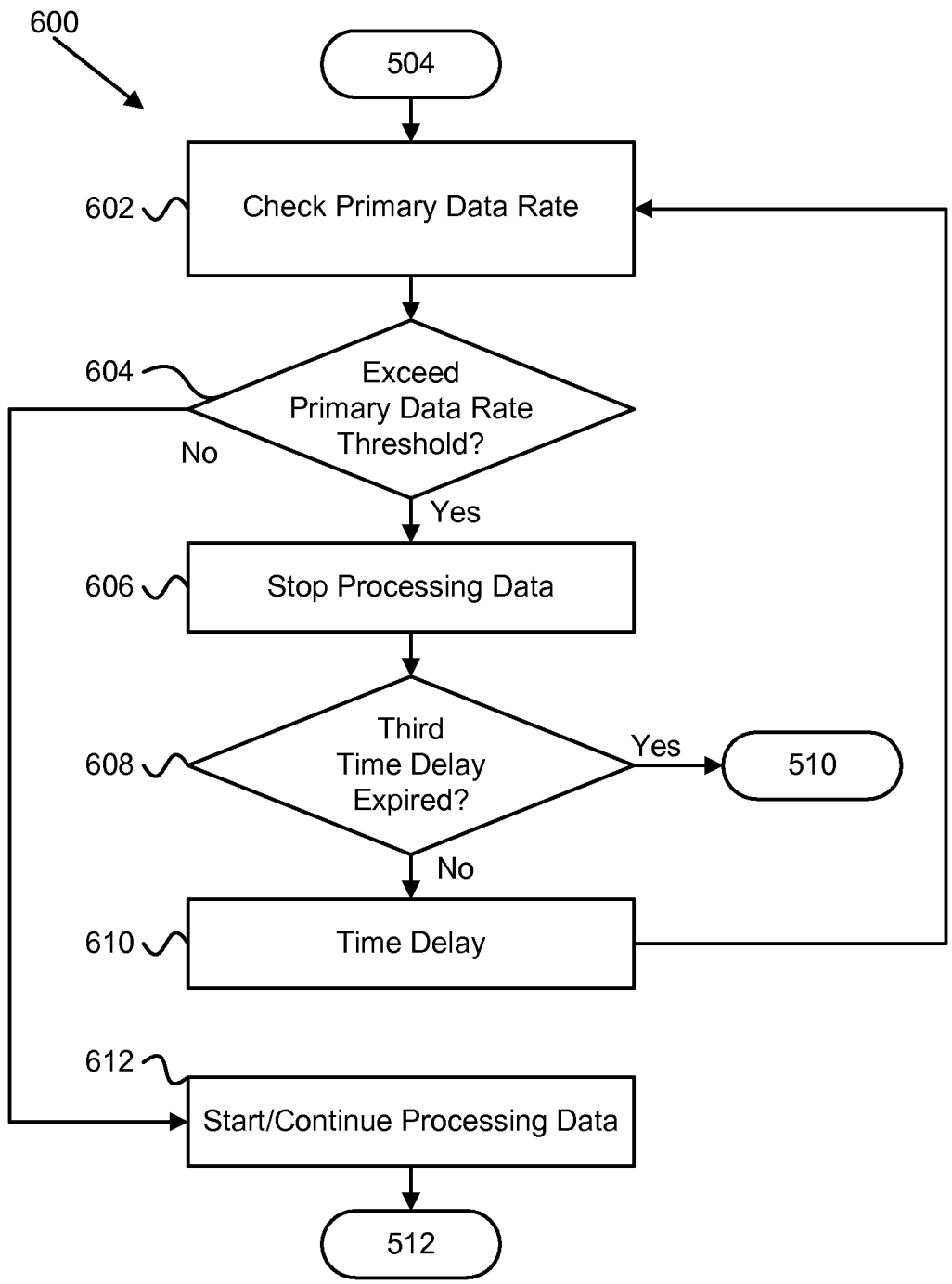
FIG. 6 is a schematic flow chart diagram illustrating a more detailed embodiment of a method to determine if a primary server is under broadcast storm or DoS attack in accordance with the present invention.

FIG. 6 is a schematic flow chart diagram illustrating a more detailed embodiment of a method 600 to determine if a primary server 102 is under broadcast storm or DoS attack in accordance with the present invention. The method 600 is one example of monitoring an incoming data rate to determine if the primary server 102 is under DoS attack or broadcast storm and then taking action at an appropriate time. The method 600 begins in conjunction with the primary attack sensing module 202 monitors 504 the incoming data rate of the primary server 102 (see step 504 on FIG. 5). The primary attack sensing module 202 checks 602 the incoming data stream to the primary server 102 from the computer network 108 and determines a data rate.

The primary attack sensing module 202 then determines 604 if the data rate exceeds the primary data rate threshold. If so, the stop processing module 210 stops 606 the primary server 102 from processing data received from the computer network 108. The primary attack sensing module 202 then determines 608 if a time delay has expired. If the primary attack sensing module 202 determines 608 that a third time delay has not expired, the primary attack sensing module 202 waits 610 during one time delay and returns to sample 602 the primary server 102 data rate. If the primary attack sensing module 202 determines 608 that a third time delay has expired, the method 600 returns and the standby rate request module 304 requests 510 a standby data rate status (see step 514 on FIG. 5).

If the primary attack sensing module 202 determines 604 at any sample of the primary server 102 data rate that the data rate no longer exceeds the primary data rate threshold, the resume module 212 causes the primary server 102 to start or resume 612 processing data received from the computer network 108 (as embodied by steps 524, 526, and 528 in the method 500 in FIG. 5). In other embodiments, the method 600 may have more or less time delays, may stop processing data at a different point, etc. One of skill in the art will recognize other ways to monitor 504 an incoming data rate to the primary server 102 and take appropriate action to stop 508, 606 processing data, request 510 a standby data rate status, and to direct the primary server 102 to resume 612 (524, 526, 528) processing data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to failover to a standby server when a primary server is under broadcast storm or denial-of-service ("DoS") attack, the apparatus comprising:
   a primary attack sensing module configured to monitor a rate of incoming data from a computer network to a primary server and to determine if the rate of incoming data is above a primary data rate threshold, the primary server comprising a first processor executing a first operating system;
   a standby contact module configured to request a standby data rate status from a standby server in response to the primary attack module determining that the rate of incoming data to the primary server is above the primary data rate threshold, the standby server connected to the primary server over a private network, the standby data rate status comprising a determination by the standby server of whether a rate of data received by the standby server is above a standby data rate threshold, the standby server configured to become a primary server, the standby server comprising a second processor executing a second operating system;
   a standby receiver module configured to receive a standby data rate status from the standby server over the private network; and
   a switchover module configured to deactivate the primary server as primary and to send a command to activate the standby server as primary in response to the received standby data rate status indicating that the rate of data received by the standby server has not exceeded the standby data rate threshold, wherein the primary server remains operational after the primary server is deactivated as primary;

wherein the primary attack sensing module, the standby contact module, the standby receiver module and the switchover module comprises one or more of logic hardware and executable code stored on one or more non-transitory computer readable storage device and executed by a processor comprised in said apparatus; and wherein the standby server determines whether the rate of data received by the standby server is above a standby data rate threshold in the same manner as the primary attack sensing module determines if a rate of data received by the primary server is above the primary data rate threshold.

2. The apparatus of claim 1, further comprising a stop processing module configured to stop processing data received over the computer network in response to the primary attack module determining that the rate of incoming data from the computer network is above the primary data rate threshold, wherein the stop processing module comprises one or more of logic hardware and executable code stored on one or more non-transitory computer readable storage device and executed by a processor comprised in said apparatus.

3. The apparatus of claim 2, further comprising a resume module configured to direct the primary server to resume processing data in response to the primary attack sensing module determining that the rate of incoming data to the primary server has dropped below the primary data rate threshold for a predetermined amount of time, wherein the resume module comprises one or more of logic hardware and executable code stored on one or more non-transitory computer readable storage device and executed by a processor comprised in said apparatus.

4. The apparatus of claim 3, further comprising a switchback module configured to activate the primary server as primary and to deactivate the standby server in response to the primary attack sensing module determining that the rate of incoming data to the primary server has dropped below the primary data rate threshold and prior to the resume module directing the primary server to resume processing data, wherein the switchback module comprises one or more of logic hardware and executable code stored on one or more non-transitory computer readable storage device and executed by a processor comprised in said apparatus.

5. The apparatus of claim 1, wherein the private network comprises a connection between the primary server and the standby server that excludes the computer network over which the primary server receives data.

6. The apparatus of claim 1, wherein the primary server and the standby server comprise management servers that manage a group of servers, each of the group of servers connected to a computer network and servicing one or more clients.

7. The apparatus of claim 1, wherein the primary and standby servers are in communication with common data storage.

8. The apparatus of claim 7, wherein the common data storage comprises one or more of a storage area network ("SAN") comprising data storage devices, a redundant array of inexpensive/independent disks ("RAID"), a tape storage device, an optical drive, a backup storage system, and a hard drive.

9. The apparatus of claim 1, wherein the primary attack sensing module further comprises sampling the rate of incoming data over a period of time and determining if the rate of incoming data is above the primary data rate threshold for each sample.

10. The apparatus of claim 9, wherein sampling the rate of incoming data over a period of time comprises sampling the rate of incoming data at least three times prior to the standby contact module requesting a standby data rate status, each sampling separated by a predetermined time delay.

11. An apparatus to failover to a standby server when a primary server is under broadcast storm or denial-of-service ("DoS") attack, the apparatus comprising:

a standby attack sensing module configured to monitor a rate of incoming data from a computer network to a standby server and to determine if the rate of incoming data is above a standby data rate threshold, the standby server comprising a first processor executing a first operating system;

a standby rate request module configured to receive a standby data rate status request from a primary server over a private network, the primary server requesting the standby data rate status in response to determining that a rate of data received by the primary server is above a primary data rate threshold, the primary server comprising a second processor executing a second operating system;

a standby rate sending module configured to send a standby data rate status to the primary server over the private network in response to the standby rate request module receiving the standby data rate status request, the standby data rate status comprising an indication of whether the rate of incoming data to the standby server is above the standby data rate threshold;

a switchover receiver module configured to receive a switchover command and to activate the standby server as primary in response to receiving the switchover command, the primary server deactivated as primary, the primary server sending the switchover command in response to receiving the standby data rate status and the standby data rate status indicating that the rate of incoming data to the standby server is below the standby data rate threshold, wherein the primary server remains operational after the primary server is deactivated as primary, wherein the standby attack sensing module, the standby rate request module, the standby rate sending module and the switchover receiver module comprises one or more of logic hardware and executable code stored on one or more non-transitory computer readable storage device and executed by a processor comprised in said apparatus;

wherein the standby server determines whether the rate of data received by the standby server is above a standby data rate threshold in the same manner as the primary attack sensing module determines if a rate of data received by the primary server is above the primary data rate threshold.

12. The apparatus of claim 11, further comprising a standby return module configured to receive a return command and to return the standby server to standby, the return command comprising an instruction to return the standby server to standby and sent in response to the primary server determining that the rate of incoming data to the primary server is below the primary data rate threshold for a predetermined period of time, wherein the standby return module comprises one or more of logic hardware and executable code stored on one or more non-transitory computer readable storage device and executed by a processor comprised in said apparatus.

13. The apparatus of claim 11, wherein the standby server stops processing data received from the computer network in response to the standby attack sensing module determining that the rate of incoming data from the computer network to the standby server is above the standby data rate threshold.

14. A system to failover to a standby server when a primary server is under broadcast storm or denial-of-service ("DoS") attack, the system comprising:
- a computer network;
- a primary server in communication with the computer network and configured to receive data over the computer network and to process the data, the primary server comprising a first processor executing a first operating system;
- a standby server in communication with the computer network and configured to receive data over a computer network and to process the data when acting as a primary server, the standby server comprising a second processor executing a second operating system;
- a private network facilitating private communication between the primary server and the standby server;
- a primary attack sensing module configured to monitor a rate of incoming data from the computer network and to generate an alert in response to determining that the rate of incoming data is above a primary data rate threshold;
- a standby contact module configured to request a standby data rate status from the standby server in response to the primary attack module determining that the rate of incoming data to the primary server is above the primary data rate threshold, the standby data rate status comprising a determination by the standby server of whether a rate of data received by the standby server is above a standby data rate threshold;
- a standby receiver module configured to receive a standby data rate status from the standby server over the private network;
- a switchover module configured to deactivate the primary server as primary and activate the standby server as primary in response to the received standby data rate status indicating that the rate of data received by the standby server has not exceeded the standby data rate threshold, wherein the primary server remains operational after the primary server is deactivated as primary;
- wherein the primary attack sensing module, standby contact module, standby receiver module and switchover module comprises one or more of logic hardware and executable code stored on one or more non-transitory computer readable storage device and executed by a processor of said system; and
- wherein the standby server determines whether the rate of data received by the standby server is above a standby data rate threshold in the same manner as the primary attack sensing module determines if a rate of data received by the primary server is above the primary data rate threshold.

15. The system of claim 14, wherein the standby server receives data over the computer network from which the primary server receives data.

16. The system of claim 14, wherein the standby server receives data over a computer network different from the computer network that the primary server receives data.

17. The system of claim 14, wherein the private network comprises a secure network inaccessible to unauthorized devices.

18. The system of claim 17, wherein the private network comprises one of an Ethernet network and an RS-485 network.

19. The system of claim 14, wherein the standby server comprises hardware, code, and data necessary to enable the standby server to assume a role of primary server after receiving a switchover command.

20. A computer program product comprising a non-transitory computer readable storage medium having computer usable program code executable to perform operations to failover to a standby server when a primary server is under broadcast storm or denial-of-service ("DoS") attack, the operations of the computer program product comprising:
- monitoring a rate of incoming data from a computer network to a primary server and determining if the rate of incoming data is above a primary data rate threshold, the primary server comprising a first processor executing a first operating system;
- requesting a standby data rate status from a standby server in response to determining that the rate of incoming data to the primary server is above the primary data rate threshold, the standby server connected to the primary server over a private network, the standby data rate status comprising a determination by the standby server of whether a rate of data received by the standby server is above a standby data rate threshold, the standby server configured to become a primary server, the standby server comprising a second processor executing a second operating system;
- receiving a standby data rate status from the standby server over the private network;
- deactivating the primary server as primary and sending a command to activate the standby server as primary in response to the received standby data rate status indicating that the rate of data received by the standby server has not exceeded the standby data rate threshold, wherein the primary server remains operational after the primary server is deactivated as primary; and
- wherein the standby server determines whether the rate of data received by the standby server is above a standby data rate threshold in the same manner as the primary attack sensing module determines if a rate of data received by the primary server is above the primary data rate threshold.

21. The computer program product of claim 20, further comprising suspending processing of data in response to determining that the rate of incoming data to the primary server is above the primary data rate threshold.

22. The computer program product of claim 20, further comprising sending a command to the standby server to return to standby and to return the primary server to primary in response to the rate of incoming data to the primary server remaining below the primary data rate threshold for a predetermined period of time.

* * * * *